United States Patent Office 3,531,453
Patented Sept. 29, 1970

3,531,453
POLY(VINYL CHLORIDE) OF IMPROVED
THERMAL STABILITY
Norman G. Gaylord, New Providence, and Akio Takahashi, Parsippany, N.J., assignors to Gaylord Associates Inc., Newark, N.J., a corporation of New Jersey
No Drawing. Filed Mar. 11, 1968, Ser. No. 711,844
Int. Cl. C08f 27/00, 3/30
U.S. Cl. 260—92.8                                   5 Claims

ABSTRACT OF THE DISCLOSURE

Poly(vinyl chloride) with improved thermal stability is prepared by contacting vinyl chloride homopolymer with a dialkylaluminum halide followed by treatment with a lower alkanol.

---

The utilization of vinyl chloride polymers is directly related to their processability. In order to obtain an adequately low melt viscosity for improved processability without reducing the molecular weight, it is necessary to either incorporate an external plasticizer or polymeric additive, utilize a comonomer in the polymerization and/or process at elevated temperatures. The use of an external plasticizer leads to a flexible thermoplastic while copolymerization or the use of additives lead to flexible or rigid polymers depending upon the concentration of comonomer or additive. In either case, the second order or glass transition temperature is generally decreased.

Increasing the processing temperature is an obvious method for decreasing the melt viscosity, making possible high speed fabrication, including injection molding, extrusion and blow molding, of rigid poly(vinyl chloride). However, at elevated temperatures the polymer has poor thermal stability as manifested by discoloration and a loss of properties. The degradation noted upon the exposure of poly(vinyl chloride) to elevated processing temperatures results from thermal and thermo-oxidative dehydrochlorination. Consequently stabilizers are incorporated into the polymer in order to retard or delay the initiation or propagation of dehydrochlorination as well as to scavenge or react with the evolved hydrogen chloride. The stabilizers commonly used include metal compounds, such as lead, barium, cadmium, tin, calcium and zinc compounds, as well as epoxides and organic phosphorus compounds. The disadvantage of such added stabilizers include their potential toxicity, color, incompatibility, extractability, migration and cost.

It is an objective of the present invention to provide a poly(vinyl chloride) which may be processed at elevated temperatures with a greatly reduced tendency to discolor and degrade.

A still further objective of the present invention is to provide a rigid poly(vinyl chloride) which is suitable for high speed fabrication as in injection molding, extrusion and blow molding.

Another objective of the present invention is to provide processes for the preparation of poly(vinyl chloride) with improved thermal stability.

It has now been discovered that treatment of poly(vinyl chloride) with a dialkylaluminum halide followed by treatment with a lower alkanol yields a polymer with improved thermal stability as demonstrated by the reduction of discoloration on molding into a film at 200° C. in air, reduced rate of dehydrochlorination on heating in an inert atmosphere at 180° C., higher onset and peak temperatures for hydrogen chloride evolution as determined by differential thermal analysis, and improved thermal processability as determined by torque rheometer data.

The reaction may be carried out with poly(vinyl chloride) prepared with free radical or ionic catalysts, by emulsion, suspension or bulk polymerization techniques. The process is especially effective with suspension poly(vinyl chloride) which is generally known to possess poor thermal stability. However, improved thermal stability may also be imparted to polymers prepared by mass or bulk polymerization procedures.

The reaction is carried out heterogeneously in order to control the extent of reaction and to simplify the isolation procedure. The poly(vinyl chloride) is suspended in a suitable solvent, i.e. an organic reaction medium which will suspend or at best only partially swell rather than dissolve the polymer at the reaction temperatures of $-10$ to $+30°$ C.

Halogenated aromatic hydrocarbons such as monochlorobenzene, dichlorobenzene, monochlorotoluene, dichlorotoluene and other halogen substituted aromatic hydrocarbons which are liquids under the reaction conditions, i.e. at temperatures of $-10$ to $+30°$ C., are the preferred solvents. However, the halogenated aromatic hydrocarbons may be mixed with up to 75% by volume of other solvents such as aliphatic or aromatic hydrocarbons or halogenated aliphatic or aromatic hydrocarbons which are liquids and inert towards poly(vinyl chloride) as well as alkyl aluminum halides under the reaction conditions employed. Thus, hexane, heptane, chloroform, carbon tetrachloride, methylene chloride, tetrachloroethylene, benzene or toluene may be used in admixture with the halogenated aromatic hydrocarbons.

The total quantity of solvent used may be varied over a wide range of concentrations depending upon the batch size, the nature of the agitation and the available cooling capacity. A five to twenty fold volume excess of solvent by weight of poly(vinyl chloride) is a convenient concentration.

The dialkylaluminum halide may be added per se or may be generated in situ. The alkyl substitutent contains one to twelve carbon atoms although the lower alkyl groups such as ethyl, propyl, isopropyl, butyl, isobutyl, amyl and hexyl are preferred due to their commercial availability. The alkyl substitutent my also be arylalkyl. The two alkyl groups in the dialkylaluminum halide may be the same or different. The sesquihalide, that is, a mixture of a dialkylaluminum halide and a monoalkylaluminum dihalide may also be used.

Although the halide group in the dialkylaluminum halide may be chlorine, bromine or iodine, the chloride is preferred due to the excess reactivity of the bromide and iodide.

The dialkylaluminum halide may be generated in situ, for example, by the reaction of an aluminum alkyl with either titanium tetrachloride or a reactive organic halide such as benzyl chloride or tertiary butyl chloride.

The concentration of dialkylaluminum halide may vary from 0.2–5% by weight based on the poly(vinyl chloride), although the preferred concentration is between 0.5–1.5%.

The reaction temperature is $-10$ to $+30°$ C. and the reaction time varies from 15 minutes to 2 hours. A reaction temperature of 5–10° C. and a reaction time of 1 hour are preferred to avoid degradation of the poly(vinyl chloride).

At the conclusion of the reaction with the dialkylaluminum halide, it is necessary to add a small amount of a lower alkanol, followed by precipitation of the reaction mixture in a large amount of alkanol. Alternatively, a large amount of alkanol may be added to the reaction mixture.

The precipitated polymer is then filtered, washed with additional alkanol or other suitable solvent in order to remove residual reaction medium, and dried in the usual manner.

The alkanol may contain 1–4 carbon atoms. The suitable alkanols are water soluble, for example, methanol and ethanol. However, methanol is the preferred alkanol.

Although the addition of the alkanol is a necessary part of the process, the concentration of alkanol is not significant. The minimum concentration is equimolar to that of the dialkylaluminum halide. However, considerably larger amounts are used as a convenient means of separating the poly(vinyl chloride) from the reaction medium.

When poly(vinyl chloride), free of plasticizer or stabilizer, is compression molded in air at 200° C. under adequate pressure, e.g. 500–6000 p.s.i., thermal degradation results in discoloration to a pink to brown colored film. When the treated poly(vinyl chloride) of the present invention is pressed under the same conditions, the resultant film is of a faintly yellow color.

Although other compounds containing active hydrogen atoms such as acetic acid may be added to the reaction mixture in lieu of the lower alkanol, at the conclusion of the reaction of the poly(vinyl chloride) with the dialkylaluminum halide, the isolated poly(vinyl chloride) has a lower thermal stability as shown by the pink to brown discoloration of the film produced by compression molding at elevated temperatures. Similarly, a compound which does not contain active hydrogen atoms such as n-hexane yields a poly(vinyl chloride) which gives a highly discolored film.

In order to improve the thermal stability of poly(vinyl chloride), it is common practice to add metal compounds, generally metalloorganic compounds, in concentrations of 1–5 parts per 100 parts of poly(vinyl chloride). Although the treated poly(vinyl chloride) of the present invention, in the absence of an added stabilizer, yields only faintly discolored films, completely colorless films are obtained when the conventional stabilizers are added in concentrations of 0.1–0.3 part per 100 parts of treated poly(vinyl chloride). Actually, the use of the conventional stabilizers in the usual concentrations of 1–5 parts per 100 parts of treated poly(vinyl chloride) is sometimes detrimental and results in greater color development than in the absence of stabilizer.

A further indication of the enhanced thermal stabilization inherent in the treated polymer is the reduction in the concentration of conventional stabilizer required to prevent discoloration of an untreated poly(vinyl chloride), when the latter is blended with the treated poly(vinyl chloride).

Two additional tests for thermal stability as measured by hydrogen chloride evolution demonstrate the improved stability of the treated poly(vinyl chloride).

The first test is a modification of ASTM Method D793–49 (1965) which describes a procedure for determining the short-time stability at elevated temperatures of plastics containing chlorine. Utilizing the apparatus described in the ASTM method, 10 g. of polymer is heated at 180° C. in a flask immersed in an oil bath and preheated nitrogen is passed over the sample. Under these conditions the sample slowly evolves hydrogen chloride which is carried by the nitrogen and bubbled into 70 ml. of distilled water. The pH of the solution is continuously measured with a pH meter and converted to millimoles of HCl, by means of a calibration curve constructed by adding known quantities of HCl to 70 ml. of distilled water. Further calibration is carried out by bubbling the evolved HCl into a dilute sodium hydroxide solution and back titrating with dilute hydrochloric acid.

The results are plotted as millimoles of hydrogen chloride evolved as a function of time and the shape of the curve, and the time required for the evolution of HCl representing 0.1 mole percent (0.058 weight percent) decomposition of the poly(vinyl chloride) are noted.

The curve obtained with poly(vinyl chloride) prepared by suspension polymerization generally indicates autocatalytic thermal dehydrochlorination and the time required for 0.1 mole percent decomposition is usually less than 35 minutes. When the poly(vinyl chloride) is obtained by bulk polymerization the dehydrochlorination plot is generally linear, shows little autocatalytic character, and the time for 0.1 mole percent decomposition is approximately 40 minutes.

When the product from the treatment of poly(vinyl chloride) with diethylaluminum chloride followed by precipitation with methanol is subjected to the HCl evolution test, irrespective of whether the base poly(vinyl chloride) is prepared by suspension or bulk polymerization techniques, the curve is essentially linear and the time for 0.1 mole percent decomposition is generally more than 50 minutes and often as much as 75 minutes.

Differential thermal analysis is utilized as a further measure of thermal stability. Samples are heated at the rate of 10° C./minute from 25–500° C. in a nitrogen atmosphere. The peak of the endothermic reaction resulting on decomposition of the polymer samples is a measure of the degradation, e.g. dehydrochlorination, of the poly(vinyl chloride). Similarly, the onset of decomposition is indicated by the temperature at which the trace or plot leaves the baseline.

Whereas the onset of decomposition, under the conditions described above, for unmodified poly(vinyl chloride) is observed at approximately 240–260° C. and the peak decomposition temperature is approximately 275–280° C., the treated poly(vinyl chloride) prepared from the same unmodified base polymer shows the onset of decomposition at approximately 260–270° C. and a peak decomposition temperature of 290–325° C.

Whereas the addition of a stabilizer may retard the initial rate of dehydrochlorination sufficiently to yield a colorless or faintly discolored film at 200° C., the results of the differential thermal analysis and the hydrogen chloride evolution test are unchanged. Thus, the addition of 0.5 part of cadmium stearate per 100 parts of unmodified bulk polymerized poly(vinyl chloride) results in a composition which yields an essentially colorless film at 200° C. However, the hydrogen chloride evolution test at 180° C. indicates 0.1 mole percent decomposition after 40 minutes, unchanged from the value for the unstabilized polymer. Similarly, the differential thermal analysis shows an unchanged $T_g$ of 81° C., onset of decomposition at 245° C. and a peak decomposition temperature of 280° C.

The thermal stability of poly(vinyl chloride) has a critical bearing on its processability. The torque rheometer simulates extrusion conditions and provides a laboratory test method for predicting processability. The test method utilizes an instrumented Brabender Plasticorder or miniature Banbury mixer and has been described by J. B. DeCoste in the Society of Plastics Engineers Journal, volume 21, pages 764–773, 1965.

The torque of the poly(vinyl chloride) charge is recorded while the charge is subjected to a shear of 95 p.p.m. at a head temperature of 195° C. The torque-time curve indicates the time between the fluxing and breakdown torques.

Whereas the stability of an unmodified poly(vinyl chloride), under the conditions of the torque rheometer test, is 3–4 minutes, the poly(vinyl chloride) prepared by treatment with diethylaluminum chloride has a stability of more than 25 minutes.

The invention will be more fully understood by references to the following illustrative embodiments.

EXAMPLE 1

Unmodified poly(vinyl chloride)

(A) Compression molding at 200° C. in air.—Poly(vinyl chloride), prepared by suspension polymerization, in the absence of plasticizer or stabilizer, is compression molded in air by preheating the powdered sample at 200° C. for one minute, followed by pressing at 200° C. for one minute under 6000 p.s.i. pressure. The resultant disk has a red to brown color.

When poly(vinyl chloride) prepared by bulk polymerization, is pressed under the same conditions, the resultant disk is only slightly less colored.

(B) Dehydrochlorination at 180° C.—The rate of dehydrochlorination is determined by a modification of ASTM Method D793-49 (1965).

The time for evolution of hydrogen chloride corresponding to 0.1 mole-percent decomposition of a 10 g. sample of poly(vinyl chloride) prepared by suspension polymerization is 30-35 minutes. Poly(vinyl chloride) prepared by bulk polymerization gives a value of 40-45 minutes for 0.1 mole-percent decomposition.

(C) Differential thermal analysis.—A sample of film pressed at 200° C. in air, as described in Example 1(A), is subjected to differential thermal analysis while the sample is heated at a rate of 10° C. per minute from 25-500° C. in a nitrogen atmosphere.

A sample of poly(vinyl chloride) prepared by suspension polymerization has a second order transition temperature ($T_g$) of 82° C., the onset of decomposition occurs at 247° C., while the endothermic peak decomposition temperature is noted at 276° C.

A sample of poly(vinyl chloride) prepared by bulk polymerization has a $T_g$ of 84° C., the onset of decomposition occurs at 245° C. and the peak decomposition temperature is noted at 278° C.

(D) Torque rheometer test.—A Brabender Torque Rheometer instrumented to continuously record the torque-time curve is utilized to measure the stability of poly(vinyl chloride) under simulated processing conditions. The poly(vinyl chloride) is loaded to completely fill a 60 ml. capacity No. 6 bowl. Torque is measured in gram-meters by a dynamometer on the motor shaft that drives rheometer blades at a uniform shear rate of 95 r.p.m. The head temperature is maintained at 195° C. by circulating oil heat.

A torque-time curve is recorded while the charge is subjected to the indicated shear and temperature. The length of the section of the curve between the fluxing and the breakdown torques, measured as the points of tangency between a 30° angle and the torque-time curve, is a measure of the thermal processing stability.

A sample of poly(vinyl chloride), prepared by suspension or bulk polymerization, in the absence of stabilizers or plasticizers, has a stability time of 3-4 minutes.

EXAMPLE 2

Chlorobenzene, 200 ml., and 20 g. of poly(vinyl chloride), prepared by suspension polymerization, were placed in a 3-necked flask equipped with a reflux condenser, glass anchor blade stirrer, thermometer and gas inlet and outlet. Nitrogen was bubbled through the suspension which was then cooled to 5-8° C. Diethylaluminum chloride, 2 mmoles, was added and stirring was continued for one hour while the temperature was maintained at 5-10° C. The reaction mixture was then treated with 10 ml. of methanol, following which the mixture was poured into 500 ml. of methanol. The precipitated poly(vinyl chloride) was filtered, washed with methanol, and air dried overnight. The drying was completed at 40-50° C. in a vacuum oven. The dried product weighed 20.0 g., indicating quantitative recovery.

Th treated poly(vinyl chloride) was pressed at 200° C. to yield a film which had a slightly yellow cast in contrast to the pink to brown colored film pressed from the untreated poly(vinyl chloride). The addition of 0.2 part of an organotin, barium-cadmium or non-toxic stabilizer to 100 parts of treated poly(vinyl chloride) resulted in a film which was as equally colorless as the film produced from untreated poly(vinyl chloride) containing 1 part of stabilizer per 100 parts of polymer.

The time for the evolution of hydrogen chloride at 180° C. corresponding to 0.1 mole-percent decomposition, from the treated poly(vinyl chloride) in the absence of stabilizer, was 60 minutes. The differential thermal analysis indicated a $T_g$ of 84° C., the onset of decomposition at 270° C., and the peak decomposition temperature at 305° C. The torque rheometer test indicated a stability of more than 25 minutes.

EXAMPLE 3

The treatment in Example 2 was repeated substituting acetic acid for the methanol in the treatment of the reaction mixture. Thus, 10 ml. of acetic acid was added to the reaction mixture, after completion of the treatment of the poly(vinyl chloride) with diethylaluminum chloride, following which the mixture was poured into 500 ml. of acetic acid. The filtered poly(vinyl chloride) was washed with water and air dried overnight.

The treated poly(vinyl chloride) was pressed at 200° C. under 6000 p.s.i. pressure to yield a film which was of a pinkish brown color. However, the time for hydrogen chloride evolution at 180° C. was 53 minutes for a 0.1 mole-percent decomposition.

The treated poly(vinyl chloride) prepared by the processes of the present invention may be compounded, fabricated and utilized in a manner similar to that applicable to untreated poly(vinyl chloride). However, the greater thermal stability of the treated homopolymers permits the use of fabrication and processing methods as well as applications which require higher temperatures. Further, the ability to withstand elevated temperatures permits the use of lower stabilizer concentrations and avoids the need to use less desirable, that is, more expensive, toxic, incompatible, migrating or extractable, stabilizers.

The treated poly(vinyl chloride) may be compounded with plasticizers, lubricants, processing aids, surfactants, impact modifiers, pigments and fillers, as is generally the case with unmodified poly(vinyl chloride). Higher molecular weight resins, after treatment, may be processed with lower quantities of these additives than usual since the higher temperatures needed to achieve processing viscosities can be readily utilized. In addition to the conventional chemical blowing agents, materials which generate gases at higher temperatures may be used to produce foamed products with both open and closed cell structures.

The treated poly(vinyl chloride) may be formed and shaped by compression, injection and blow molding, extrusion, calendering, vacuum forming and fluid bed processes, as well as plastisol, organosol, hydrosol, plastigel, hot melt and solution techniques. Slush and rotational molding may also be used. The rigid products may be utilized in the form of bottles and other containers, pipe, fittings, moldings, blister packs, records, monofilaments, house siding, window frames, doors and flooring. Flexible products may be utilized in the form of films, sheets, foams, coatings, laminates and adhesives for automotive, packaging, building, electrical, textile, houseware, furniture and other applications.

What is claimed is:

1. The process which comprises contacting poly(vinyl chloride) with a dialkylaluminum halide in the presence of a halogenated aromatic hydrocarbon solvent, followed by treatment with a lower alkanol containing 1-4 carbon atoms.

2. The process of claim 1 wherein the dialkylaluminum halide is diethylaluminum chloride and the lower alkanol is methanol.

3. The process of claim 1 wherein the poly(vinyl chloride) is suspended in an inert solvent containing 25–100% halogenated aromatic hydrocarbons.

4. The process of claim 3 wherein the halogenated aromatic hydrocarbon is chlorobenzene.

5. A product of the process of claim 1.

References Cited
FOREIGN PATENTS
834,937  5/1960  Great Britain.

JOSEPH L. SCHOFER, Primary Examiner
J. A. DONAHUE, Jr., Assistant Examiner